United States Patent
Hudman et al.

(10) Patent No.: US 12,315,484 B2
(45) Date of Patent: May 27, 2025

(54) ACTIVE REDUCTION OF FAN NOISE IN A HEAD-MOUNTED DISPLAY

(71) Applicant: Valve Corporation, Bellevue, WA (US)

(72) Inventors: Joshua Mark Hudman, Issaquah, WA (US); Ivan McCraken, Belleveue, WA (US)

(73) Assignee: Valve Corporation, Bellevue, WA (US)

( * ) Notice: Subject to any disclaimer, the term of this patent is extended or adjusted under 35 U.S.C. 154(b) by 138 days.

(21) Appl. No.: 17/941,363

(22) Filed: Sep. 9, 2022

(65) Prior Publication Data

US 2024/0096306 A1    Mar. 21, 2024

(51) Int. Cl.
*G10K 11/16*  (2006.01)
*A63F 13/54*  (2014.01)
*G06F 1/16*  (2006.01)
*G06F 1/20*  (2006.01)

(52) U.S. Cl.
CPC ............. *G10K 11/16* (2013.01); *A63F 13/54* (2014.09); *G06F 1/163* (2013.01); *G06F 1/203* (2013.01); *A63F 2300/6081* (2013.01)

(58) Field of Classification Search
CPC . G10K 11/16; A63F 13/54; A63F 2300/6081; G06F 1/163; G06F 1/203
USPC .............. 381/56, 58, 71.6, 71.8, 74, 306
See application file for complete search history.

(56) References Cited

U.S. PATENT DOCUMENTS

| | | | |
|---|---|---|---|
| 10,261,555 B1* | 4/2019 | Cooper ............. | H05K 7/20209 |
| 2010/0094466 A1* | 4/2010 | Judge ................... | F25B 49/02 |
| | | | 700/275 |
| 2014/0100709 A1* | 4/2014 | Sakurai ............ | H05K 7/20836 |
| | | | 700/300 |
| 2020/0404445 A1* | 12/2020 | Amengual Gari ....... | H04R 3/04 |
| 2023/0402027 A1* | 12/2023 | Li ....................... | H04R 1/1083 |

OTHER PUBLICATIONS

Chang et al. "Active Noise Control in Headsets by Using a Low-Cost Microcontroller", IEEE Transactions on Industrial Electronics, vol. 58, No. 5. May 30, 2011(May 30, 2011). Retrieved on Dec. 25, 2023. Retrievedfrom<URL:https://ieeexplore.IEEE.org/document/5510140., 7 pages.

PCT Search Report and Written Opinion mailed on Feb. 14, 2024 for PCT Application No. PCT/US2023/073739 from PCT Summary, 14 page.

(Continued)

*Primary Examiner* — William A Jerez Lora
(74) *Attorney, Agent, or Firm* — Lee & Hayes, P.C.

(57) ABSTRACT

Described herein are active noise reduction (ANR) techniques for reducing noise produced by a fan(s) of a head-mounted display (HMD). An example process may include receiving data indicative of a noise that is being produced by the fan(s), determining, based at least in part on the data and using a model(s), one or more audio parameter values, and outputting, via one or more off-ear speakers of the HMD, a sound(s) having one or more audio characteristics based at least in part on the one or more audio parameter values to reduce the noise produced by the fan(s) at a location(s) of an ear(s) of the user of the HMD.

20 Claims, 5 Drawing Sheets

(56) References Cited

OTHER PUBLICATIONS

JP 9-15527 A (Olympus Optical Co Ltd) Jan. 17, 1997 (Jan. 17, 1997), 6 pages.
Kuo et al. "Active Noise Control System for Headphone Applications", IEEETransactions on Control Systemstechnology, vol. 14, No. 2. Mar. 31, 2006 (Mar. 31, 2006). Retrieved on Dec. 25, 2023. Retrieved from <URL: https://ieeexplore.ieee.org/document/1597204, 5 pages.

\* cited by examiner

US 12,315,484 B2

ACTIVE REDUCTION OF FAN NOISE IN A HEAD-MOUNTED DISPLAY

BACKGROUND

Head-mounted displays (HMDs), such as virtual reality (VR) headsets, are used both within and outside of the video game industry. Some users run their headsets to their maximum performance, such as by throttling the central processing unit (CPU) and the graphics processing unit (GPU), to achieve a high-fidelity experience. When electronic components are running at or near their maximum performance, they tend to get hot. Many VR headsets include fans to cool electronic components when they get too hot, thereby preventing them from overheating.

With VR headsets that have off-ear speakers, the noise produced by the fan(s) of the headset can be unpleasant for the headset user. Moreover, the fan noise may interfere with the user's ability to hear the sound of the audio content being output via the off-ear speakers, such as the sound of a video game being played by the user. For example, when a fan of the headset is operating, the fan may produce a humming, buzzing, or whirring sound that is audible to the headset user due to the off-ear speakers of the headset.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
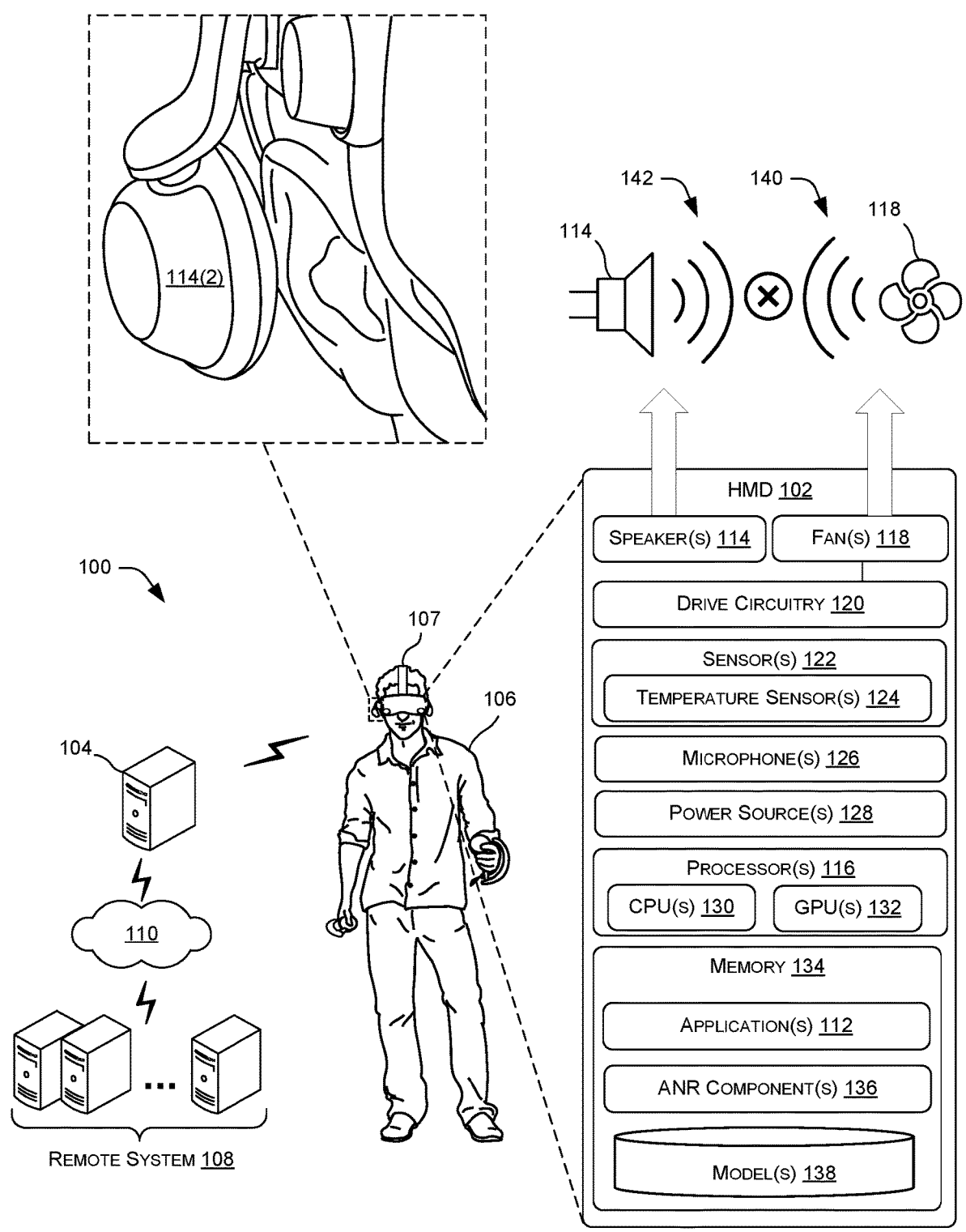
FIG. 1 illustrates an example HMD system in which techniques disclosed herein can be implemented for actively reducing noise produced by a fan(s) of a HMD, in accordance with embodiments disclosed herein.

When a user of a HMD desires a high-fidelity experience, the user may configure the HMD to run certain electronic components (e.g., the CPU, the GPU, etc.) at their maximum performance, or the HMD may be a high-performance HMD that always runs electronic components at their maximum performance by default. Such a HMD may allow the user to play an "intense" video game with high-fidelity graphics, low latency, and/or other optimized performance parameters. As mentioned above, when electronic components of the HMD run at or near their maximum performance, they tend to generate heat, which causes the electronic components to get hot. A temperature sensor of the HMD may sense the temperature of an electronic component(s) that is getting too hot, which can trigger a fan(s) of the HMD to turn on, or otherwise activate, so that the fan(s) starts to cool the overheating electronic component(s). The fan(s) may prevent the electronic component(s) from overheating and shutting down and/or causing the user discomfort. However, the fan(s) also produces noise as a byproduct. With off-ear speakers of the HMD, this fan noise can be unpleasant for the user of the HMD, and it may interfere with the user's experience, such as by making it difficult for the user to hear a desired sound that is being output by the off-ear speakers (e.g., the sound of a video game being played by the user via the HMD).

Described herein are, among other things, active noise reduction (ANR) techniques, as well as devices and systems to implement the techniques for reducing the noise produced by a fan(s) of a HMD at a location(s) of an ear(s) of a user of the HMD. Although "ANR" is the terminology used throughout this disclosure, it is to be appreciated that alternate terminology, such as "active noise control (ANC)," "noise cancellation (NC)," "noise control," and/or "noise reduction" may be used interchangeably with the ANR terminology used herein. Furthermore, it is to be appreciated that the ANR techniques described herein are at least partially "active" (e.g., using a power source for noise reduction), as opposed to fully-passive noise reduction techniques that use noise-isolating materials (e.g. insulation) rather than a power source. Nevertheless, passive noise reduction techniques may be used in combination with ANR techniques described herein.

When implemented on a HMD with one or more off-ear speakers, the ANR techniques described herein improve the audio experience for the user of the HMD by reducing the fan noise at a location(s) of the user's ear(s). To illustrate, a HMD may be worn by a user for purposes of immersing the user in a VR environment or an augmented reality (AR) environment. An application (e.g., a video game) may be executed on the HMD, or on a host computer of an HMD system that includes the HMD. As it executes, the application generates pixel data and audio data for output on the HMD. The pixel data is used for displaying video content of the executing application on the HMD as a series of frames, and the audio data is used for outputting, via the speaker(s) of the HMD, sound corresponding to audio content of the executing application.

The speaker(s) of the HMD include "off-ear" speaker(s) (sometimes called "open-ear" speaker(s)), meaning that the speaker(s) does/do not cover the ear(s) of the user. Instead, the off-ear speaker(s) leave(s) the user's ear(s) uncovered, such as by the speaker(s) being spaced away from the ear(s) by a distance that allows the user to hear both the sound corresponding to the audio content of the executing application and the sound of the user's surroundings. Users of VR headsets tend to enjoy off-ear speakers to better experience the sound of a VR game arriving at the ears from different directions. This effect would be lost if the speakers were implemented as on-ear speakers or as ear buds. The off-ear speakers of the HMD also allow for preserving some of the depth cues/signals that the human ear is designed to pick up, thereby providing a more immersive audio experience than can be provided by on-ear speakers or ear buds. However, the use of off-ear speakers also means that the user can still hear the sounds of their surroundings, including the noise from a fan(s) of the HMD whenever the fan(s) is/are operating to cool an electronic component(s) of the HMD. Notably, the techniques, devices, and systems described herein are tailored for reducing the specific noise produced by the fan(s) of the HMD without reducing other noise of the user's surroundings. In other words, the techniques described herein allow for preserving ambient noise at a location(s) of the user's ear(s) while isolating and reducing the specific noise that is being produced by the fan(s) of the HMD.

In an example ANR process, a processor(s) of a HMD system may receive data indicative of a noise that is being produced by a fan(s) of a HMD. The data received by the processor(s) can be any suitable type of data that is usable as a proxy to determine the characteristics of the fan noise at a location of an ear(s) of a user of the HMD, as will be described in more detail below. Based at least in part on the received data, and using a model(s), the processor(s) may determine one or more audio parameter values, such as a frequency parameter value, a phase parameter value, and/or an amplitude parameter value, etc. The determined audio parameter value(s) can then be used to output, via an off-ear speaker(s) of the HMD, a sound(s) having one or more audio characteristics (e.g., frequency, phase, and/or amplitude, etc.) to reduce the noise produced by the fan(s) at a location(s) of an ear(s) of the user of the HMD.

The ANR techniques described herein provide a more enjoyable, higher-fidelity audio experience for users of HMDs with off-ear speaker(s) by reducing, if not eliminating, fan noise at a location(s) of the user's ear(s). This can allow users to throttle the performance of their HMD components to their maximum performance without hearing the noise produced by the fan(s) that is/are being used to cool the electronic component(s) of the HMD (i.e., the fan(s) is/are barely audible, if not inaudible, to the user of the HMD).

Also disclosed herein are techniques for actively reducing fan noise in an energy-efficient manner, which conserves power resources of an already power-starved HMD and/or HMD system. For example, the ANR algorithms described herein may be executed on an as-needed basis, such as in response to determining that the fan is drawing power from a power source (e.g., a battery) of the HMD, and/or in response to determining that the fan is producing noise at a level where noise reduction is warranted. In other words, there may be levels of fan noise that are tolerable to most HMD users, such as low levels of fan noise. As such, power resources can be conserved even when the fan(s) is operating, so long as the fan is operating at or below a level that is tolerable for most users, which can be a configurable level. In other examples, power conservation techniques may involve determining whether and when to "open" the microphones of the HMD for performing ANR with improved accuracy, and reserving the use of the HMD's microphones for use in ANR to those instances where the benefits of more accurate noise reduction outweigh the power consumption costs attributed to using the microphones for ANR.

Also disclosed herein are systems including a HMD configured to implement the techniques and processes disclosed herein, as well as non-transitory computer-readable media storing computer-executable instructions to implement the techniques and processes disclosed herein. Although the techniques and systems disclosed herein are often discussed, by way of example, in the context of video game applications, and specifically VR gaming applications, it is to be appreciated that the techniques and systems described herein may provide benefits with other applications, including, without limitation, non-VR applications (e.g., AR applications), and/or non-gaming applications, such as industrial machine applications, defense applications, robotics applications, and the like.

FIG. 1 illustrates an example HMD system 100 in which the techniques disclosed herein can be implemented for actively reducing noise produced by a fan(s) of a HMD 102, in accordance with embodiments disclosed herein. In some examples, the HMD system 100 may include a standalone HMD 102 (sometimes referred to as an "all-in-one" HMD 102) that includes all of the components described herein, and that is operable without assistance, or with minimal assistance, from a separate computer(s). In other examples, the HMD system 100 is a distributed system that includes the HMD 102 and at least one additional computer that is separate from, yet communicatively coupled to, the HMD 102. For example, the HMD system 100 may include a host computer 104 communicatively coupled to the HMD 102. In some examples, the host computer 104 may be collocated in the same environment as the HMD 102, such as a household of a user 106 who is wearing the HMD 102. The host computer 104 and the HMD 102 may be communicatively coupled together wirelessly and/or via a wired connection. For example, the devices 102/104 may exchange data using Wi-Fi, Bluetooth, radio frequency (RF), and/or any other suitable wireless protocol. Additionally, or alternatively, the devices 102/104 may include one or more physical ports to facilitate a wired connection (e.g., a tether, a cable(s), etc.) for data transfer therebetween. In some examples, the HMD system 100 may include a remote system 108 in addition to, or in lieu of, a host computer 104 that is located in the environment of the HMD 102. The remote system 108 may be communicatively coupled to the host computer 104 and/or to the HMD 102 via a wide-area network(s) 110, such as the Internet. Accordingly, the remote system 108 may represent one or more server computers that are located at one or more remote geographical locations with respect to the geographical location of the HMD 102. In other examples, the network(s) 110 may represent a local area network (LAN), and, while the remote system 108 is considered to be remote from the HMD 102, the remote system 108 may be located in the same building as the HMD 102, for example.

The HMD 102 and the host computer 104 and/or the remote system 108 collectively represent a distributed system for executing an application 112 (e.g., a video game) to render associated video content (e.g., a series of images) on a display(s) of the HMD 102 and/or to output sounds corresponding to audio content of the executing application via one or more off-ear speakers 114 of the HMD 102. By being communicatively coupled together, the HMD 102 and the host computer 104 and/or the remote system 108 may be configured to work together in a collaborative fashion to output such video content and/or audio content via the HMD 102. Accordingly, at least some of the components, programs, and/or data described herein, such as the processor(s) 116, the application(s) 112, or the like, can reside on the host computer 104 and/or on the remote system 108. Alternatively, as mentioned above, the components, programs, and/or data can reside entirely on the HMD 102, such as in a standalone HMD 102. The host computer 104 and/or the remote system 108 can be implemented as any type of computing device and/or any number of computing devices, including, without limitation, a personal computer (PC), a laptop computer, a desktop computer, a portable digital assistant (PDA), a mobile phone, tablet computer, a set-top box, a game console, a server computer, a wearable computer (e.g., a smart watch, etc.), or any other electronic device that can transmit/receive data.

In some examples, the HMD 102 may represent a VR headset for use in VR systems, such as for use with a VR gaming system. However, the HMD 102 may additionally, or alternatively, be implemented as an AR headset for use in AR applications, or a headset that is usable for VR and/or AR applications that are not game-related (e.g., industrial applications). In AR, a user 106 sees virtual objects overlaid on a real-world environment, whereas, in VR, the user 106 does not typically see a real-world environment, but is fully immersed in a virtual environment, as perceived via the display panel(s) and the optics (e.g., lenses) of the HMD 102. It is to be appreciated that, in some VR systems, pass-through imagery of the real-world environment of the user 106 may be displayed in conjunction with virtual imagery to create an augmented VR environment in a VR system, whereby the VR environment is augmented with real-world imagery (e.g., overlaid on a virtual world). Examples described herein pertain primarily to a VR-based HMD 102, but it is to be appreciated that the HMD 102 is not limited to implementation in VR applications.

FIG. 1 depicts the HMD 102 as including various components, although, as mentioned, at least some of the components, programs, and/or data may reside elsewhere (e.g., on the host computer 104 and/or the remote system 108). The components may include, without limitation, off-ear speaker(s) 114, one or more fans 118, drive circuitry 120, one or more sensors 122, such one or more temperature sensors 124, one or more microphones 126, one or more power sources 128, one or more processors 116, such as one or more CPUs 130 and/or one or more GPUs 132, memory 134 storing, among other things, the application(s) 112, an ANR component(s) 136, and/or a model(s) 138.

The fan(s) 118 may produce noise 140 during operation of the fan(s) 118. This noise 140 may be heard by the user 106 while the application(s) 112 is executing (e.g., while a video game is being played) due to the "off-ear" speaker(s) 114 of the HMD 102. In the examples disclosed herein, the HMD 102 includes a pair of off-ear speakers 114 including a first (e.g., left) off-ear speaker 114(1) and a second (e.g., right) off-ear speaker 114(2). For example, the first (e.g., left) off-ear speaker 114(1) may be located on a left side of the HMD 102, and the second (e.g., right) off-ear speaker 114(2) may be located on a right side of the HMD 102 (e.g., from a perspective of the user 106 wearing the HMD 102). Both off-ear speaker(s) 114(1) and 114(2) are diagrammatically shown in FIG. 3, while FIG. 1 illustrates a zoomed-in view of the second (e.g., right) off-ear speaker 114(2) of the HMD 102. As the name implies, the "off-ear" speakers 114 do not cover the ears of the user 106. Instead, the off-ear speakers 114 can be spaced respective distances from the ears of the user 106, leaving the ears uncovered. As mentioned, this allows the user 106 to hear both the sound corresponding to the audio content of the executing application 112 and the sound of the user's 106 surroundings, and the user 106 may be able to adjust the distances that the off-ear speakers 114 are spaced from the ears for a desired audio experience. However, in the absence of the ANR techniques described herein, the use of the off-ear speakers 114 means that the user 106 can hear the noise 140 from the fan(s) 118 whenever the fan(s) 118 is/are operating to cool an electronic component(s) of the HMD 102. It is to be appreciated that an "off-ear" speaker, as used herein, means a speaker (or an array of speakers) that does not cover an ear of a user/listener. As such, an off-ear speaker may be spaced away (e.g., offset) from the ear by a distance such that the speaker is near, but not touching or covering the ear. As another example, an off-ear speaker can be disposed in (or affixed to) the headband of the HMD 102, and/or disposed in or on the main housing of the HMD 102 (e.g., inside of a main housing of the HMD 102). Thus, it is to be appreciated that "off-ear" speaker, as used herein, is not limited to a speaker that is in close proximity to the ear; such an off-ear speaker may be positioned at any suitable distance from the ear and/or any suitable position relative to the ear, so long as the ear is not covered by the speaker and so long as the speaker does not plug the ear canal.

The ANR component(s) 136 may represent computer-executable instructions that, when executed by the processor(s) 116, cause performance of the operations and techniques described herein, such as the execution of an ANR algorithm for reducing the fan noise 140 at a location(s) of the user's 106 ear(s). For instance, an ANR algorithm may cause the one or more off-ear speakers 114 to output a sound(s) 142 having one or more audio characteristics (e.g., frequency, phase, amplitude, etc.) to reduce the noise 140 produced by the fan(s) 118 at a location of an ear of the user 106 of the HMD 102.

For example, when the ANR component(s) 136 is executed by the processor(s) 116, the processor(s) 116 may receive data indicative of the noise 140 that is being produced by the fan(s) 118. The data received by the processor(s) 116 can be any suitable type of data that is usable as a proxy to determine the characteristics of the fan noise 140 at a location(s) of an ear(s) of a user 106 of the HMD 102. In some examples, the data received by the processor(s) 116 includes audio data representing the noise 140 captured by the microphone(s) 126 of the HMD 102. In some examples, the data received by the processor(s) 116 can additionally, or alternatively, include non-audio data, such as temperature data indicative of a temperature sensed by the temperature sensor(s) 124 of the HMD 102, drive data indicative of a level at which the fan(s) 118 is being driven via the drive circuitry 120 of the HMD 102, utilization data indicative of an amount of utilization of the CPU(s) 130 and/or the GPU(s) 132, and/or any other suitable type of data, such as vibration data indicative of fan-produced vibrations detected by an accelerometer, operation data indicative of a working speed of the fan(s) 118 determined by a tachometer, or the like. These are merely example types of data that may be indicative of the noise 140 that is being produced by the fan(s) 118.

For instance, when an electronic component(s) (e.g., the CPU(s) 130) starts to heat up and the temperature sensor(s) 124 senses an elevated temperature of the electronic component(s), this may trigger the fan(s) 118 to start operating to cool the electronic component(s). Accordingly, an elevated temperature sensed by the temperature sensor(s) 124, for example, may be indicative of the fan(s) 118 operating, and, hence, making noise 140. As another example, if the fan(s) 118 is being driven at a certain level, and if drive data indicative of this drive level is received by the processor(s) 116, such drive data is indicative of the fan(s) 118 operating, and, hence, making noise 140. As yet another example, if the CPU(s) 130 and/or GPU(s) 132 utilization suddenly increases, this may be indicative of the CPU(s) 130 and/or GPU(s) 132 running at or near maximum performance, which may indicate that the CPU(s) 130 and/or GPU(s) 132 is overheating, or is about to overheat, which, in turn, may indicate that the fan(s) 118 is operating to cool the electronic component(s), and, hence, making noise 140.

A model(s) 138 stored in the memory 134 may be referenced and used at runtime to determine, based on the received data, one or more audio parameter values that are to be used to output a noise reducing sound 142 having one or more audio characteristics (e.g., frequency, phase, amplitude, etc.) to reduce the noise 140 produced by the fan(s) 118 at a location of an ear of the user 106 of the HMD 102. Such a model(s) 138 may represent any suitable type of model, such as a mathematical model, a statistical model, a model of weights, a trained machine learning model, or the like. Accordingly, the model(s) 138 can be generated in various ways, depending on the type of model(s) 138.

Any given fan 118 can produce a tolerance range of noise, depending on a level at which the fan 118 is driven, as well as due to the inherent differences from one fan 118 to another. With this understanding, testing can be performed by operating various fans 118 over their respective operating ranges (e.g., from minimum input electrical current to maximum input electrical current), capturing the corresponding fan noise 140 using microphones positioned at locations that are representative of the locations where a user's 106 ears would be located while wearing the HMD 102, and recording the audio characteristics of the fan noise 140. This heuristic testing can be performed repeatedly to calibrate for a range of noises produced by the fans 118, as well as for a range of head sizes and shapes (because the sizes and shapes of heads vary across a user population), a range of different locations of the fans 118 relative to the microphones, and/or a range of testing environments with different levels of ambient/background noise, and the like. Over the course of such testing, the recorded audio characteristics of the fan noise 140 can be plotted as a function of the level (e.g., the input electrical current) at which the fan 118 is driven. For example, the X-axis of a graph may represent the drive level (e.g., the number of milliamps (mA) of input electrical current) of the fan 118, ranging from zero (e.g., the fan 118 is off) to N (e.g., the fan 118 is being driven at a maximum level). Meanwhile, one or more audio characteristics of the fan noise 140 can be plotted on the Y-axis of the graph, where the audio characteristics include, without limitation, frequency, amplitude, phase, etc. In some examples, averages and/or other statistical values may be computed as part of this testing process, such as the average phase of the fan noise 140 recorded at a location where the user's 106 ear would be located relative to the fan 118. In some examples, the final audio parameter values derived from testing may compensate for a latency of the microphones that are used, during testing, to mimic the user's 106 ears, thereby obtaining the audio characteristics of the fan noise 140 as the noise 140 would be heard by the human ear (as opposed to the noise 140 as "heard" by the microphones). In addition, an application(s) 112 can be executed by the HMD system 100 under test while test data is being gathered and recorded, such test data including, for example, the aforementioned temperature data, drive data, utilization data, and the like. This gathered data may be plotted as a function of the drive level of the fan 118 as well. A model(s) 138 can be generated based on such testing, the model(s) 138 being usable to determine, based on one or more types of input data, an audio parameter value(s) (e.g., a frequency parameter value, a phase parameter value, an amplitude parameter value, a tone parameter value, a pitch parameter value, a signal-to-noise ratio (SNR) parameter value, etc.) that can be used to generate a noise reducing sound 142 for reducing the fan noise 140 at a location of an ear of the user 106.

In examples where the model(s) 138 is/are a trained machine learning model(s), the test data that is gathered during the testing described above (e.g., by running the fan(s) 118 of the HMD 102 over its/their operating ranges and recording various types of test data as the fan(s) 118 is/are operated) may be used as training data to train the machine learning model(s) 138. Additionally, or alternatively, data that is gathered by HMDs 102 as they are used by end users 106 may be used as training data to train the machine learning model(s) 138. Such a trained machine learning model(s) 138 may be configured to output a classification of a noise reduction signal (e.g., in terms of its audio parameter values, such as frequency, amplitude, phase, etc.) for use in generating a noise reducing sound 142. A trained machine learning model(s) 138 used for reduction of fan noise 140 may represent a single model or an ensemble of base-level machine learning models, and may be implemented as any type of machine learning model. For example, suitable machine learning models for use by the techniques and systems described herein include neural networks (e.g., deep neural networks (DNNs), recurrent neural networks (RNNs), etc.), tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof. An "ensemble" can include a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble. Furthermore, a machine learning model(s) may be trained using any suitable learning technique, such as supervised learning, unsupervised learning, semi-supervised learning, reinforcement learning, and so on.

Once the model(s) 138 is generated and is accessible to the HMD system 100 (e.g., stored in the memory 134 thereof), the model(s) 138 can be used during runtime to reduce fan noise 140. That is, the audio parameter value(s) (determined based on the received data and using the model(s) 138) can be used to generate a noise reduction signal that causes a noise reducing sound(s) 142 to be output via the one or more off-ear speakers 114 of the HMD 102, the noise reducing sound(s) 142 causing the fan noise 140 to be reduced, if not eliminated, at a location(s) of the user's 106 ear(s). For example, with the example HMD 102 described herein, the first (e.g., left) off-ear speaker 114(1) may output a first sound 142 having one or more first audio characteristics (e.g., frequency, amplitude, phase, etc.) that are based at least in part on the determined audio parameter value(s), and the second (e.g., right) off-ear speaker 114(2) may output a second sound 142 having one or more second audio characteristics (e.g., frequency, amplitude, phase, etc.) that are based at least in part on the determined audio parameter value(s). In this manner, the first sound 142 may reduce the noise 140 produced by the fan(s) 118 at a location of a first (e.g., left) ear of the user 106, and the second sound 142 may reduce the noise 140 produced by the fan(s) 118 at a location of a second (e.g., right) ear of the user 106. The noise reducing sound(s) 142 may have the same amplitude as the amplitude of the fan noise 140, but an inverted phase (e.g., due to phase shifting) and/or a nulling frequency to reduce the unwanted fan noise 140. In some examples, the noise reducing sound(s) 142 may be represented by a sound wave having the same or directly proportional amplitude and the opposite polarity (e.g., a reversed polarity waveform) as the sound wave of the fan noise 140. The noise reducing sound(s) 142 described herein may be represented by a sound wave having any suitable audio characteristic that destructively interferes with the sound wave of the fan noise 140 at a location(s) of the ear(s) of the user 106 to reduce or attenuate the noise 140 produced by the fan(s) 118 in the vicinity of the user's ear(s).

In some examples, the first sound 142 output via the first (e.g., left) off-ear speaker 114(1) has a different audio characteristic(s) (e.g., a different phase, a different frequency, a different amplitude, etc.) than the audio characteristic(s) of the second sound 142 output via the second (e.g., right) off-ear speaker 114(2). This may be because the fan noise 140 can have different audio characteristics at the respective locations of the user's 106 left and right ears due to, for instance, asymmetries of the HMD 102 (e.g., the fan 118 might be located on one side (e.g., the left side or right side) of the HMD 102, the tolerances of the off-ear speakers 114(1) and 114)(2) may be different, etc.), thereby creating a different noise 140 (i.e., a noise 140 having a different audio characteristic(s)) at the left ear than the noise 140 at the right ear. In other examples, each off-ear speaker 114 may output the same noise reducing sound 142 having the same audio characteristics.

It is to be appreciated that the noise reducing sound 142 configured to reduce the fan noise 140 may be output by the off-ear speaker(s) 114 while the speaker(s) 114 is/are also outputting the sound corresponding to the audio content of the executing application 112. For example, the application 112 may represent a video game, and the user 106 may be playing the video game using the HMD 102 such that the noise reducing sound 142 may be output contemporaneously with the sound of the video game. Notably, the noise reducing sound 142 is not meant to reduce the sound corresponding to the audio content of the executing application 112. Rather, the noise reducing sound 142 is meant to reduce the specific noise 140 being produced by the fan(s) 118 of the HMD 102.

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
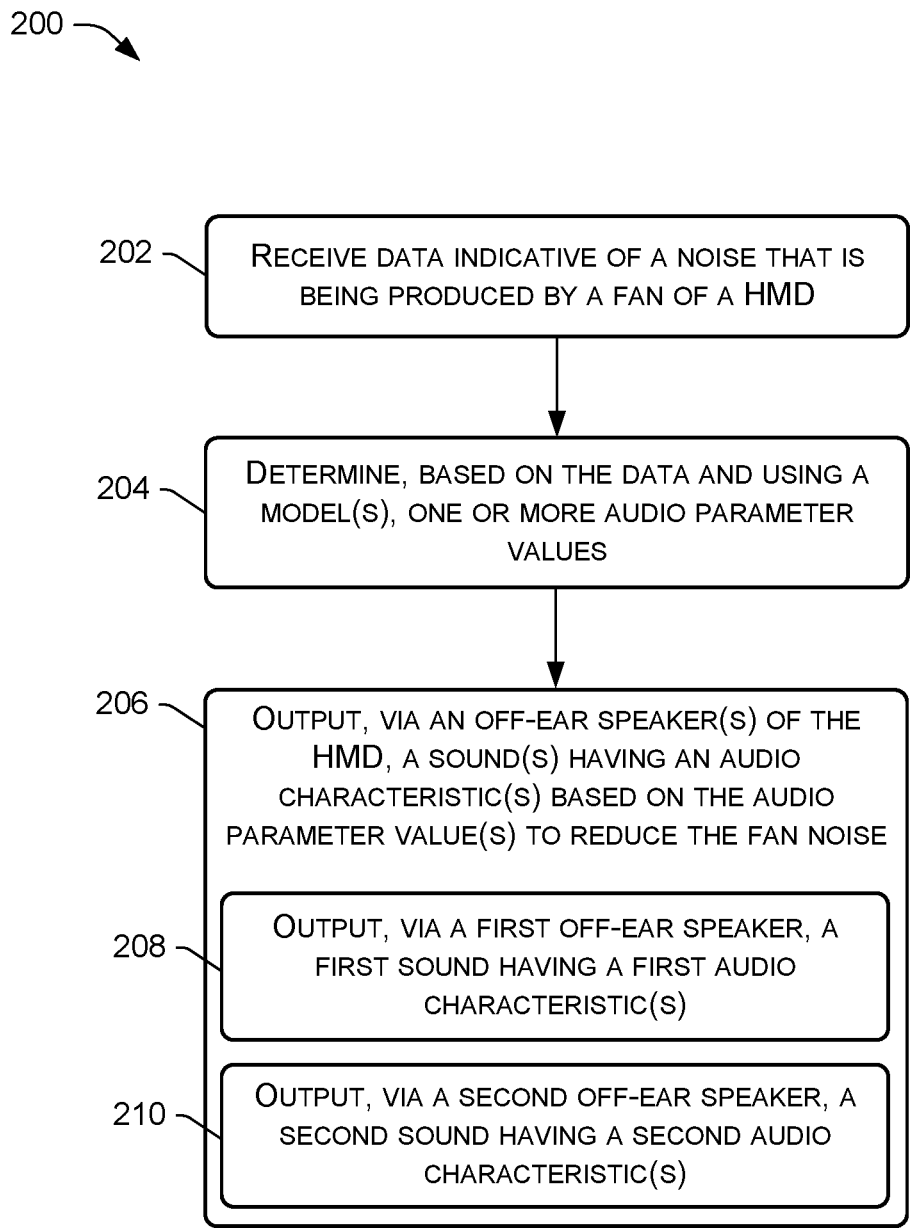
FIG. 2 is a flow diagram of an example process for actively reducing noise produced by a fan(s) of a HMD, in accordance with embodiments disclosed herein.

FIG. 2 is a flow diagram of an example process 200 for actively reducing noise 140 produced by a fan(s) 118 of a HMD 102, in accordance with embodiments disclosed herein. For discussion purposes, the process 200 is described with reference to the previous figure. Furthermore, the process 200 may be implemented by the HMD system 100 described herein.

At 202, a processor(s) 116 of the HMD system 100 may receive data indicative of a noise 140 that is being produced by a fan(s) 118 of a HMD 102 of the HMD system 100. In some examples, the data received by the processor(s) 116 at block 202 includes audio data representing the fan noise 140 captured by the microphone(s) 126 of the HMD 102. In such examples, the audio data received at block 202 may be received from the microphone(s) 126 and/or from other components that process the sound captured by the microphone(s) 126. It is to be appreciated, however, that the data received at block 202 can include non-audio data, either in combination with audio data received from the microphone (s) 126, or without such microphone-generated audio data. In examples where the data received at block 202 includes non-audio data, the non-audio data may be received from one or more other components of the HMD 102 (or the HMD system 100) besides the microphone(s) 126. For example, temperature data may be received at block 202 from the temperature sensor(s) 124 of the HMD 102, drive data may be received from the drive circuitry 120 of the HMD 102, and/or utilization data may be received from the processor(s) 116.

There can be costs and benefits to using the microphone(s) 126 of the HMD 102 for ANR. Accordingly, whether to use, or to not use, the microphone(s) 126 of the HMD 102 for ANR may depend on whether the costs of using the microphone(s) 126 for ANR outweigh the benefits of doing so. For instance, the use of audio data representing the fan noise 140 captured by the microphone(s) 126 may allow for reducing the noise 140 with improved accuracy, as compared to not using the microphone(s) 126 for ANR. For example, using the microphone(s) 126 for actively reducing the fan noise 140 may achieve measurably better noise reduction than performing ANR without the use of the microphone(s) 126 (e.g., with the use of non-audio data received from one or more other components). However, it also takes power to run the microphone(s) 126 for ANR. Thus, in some scenarios, it may not be worth the extra power to run the microphone(s) 126 for ANR if, say, a marginal (e.g., 10% or less) improvement in noise reduction performance is gained by using the microphone(s) 126 for ANR, as compared to using non-audio data received from another component(s) for ANR. Accordingly, it is to be appreciated that the data received at block 202 may exclude audio data, in some examples. In these examples, the data received at block 202 may include, without limitation, the aforementioned temperature data indicative of a temperature sensed by the temperature sensor(s) 124 of the HMD 102, drive data indicative of a level at which the fan(s) 118 is being driven via the drive circuitry 120 of the HMD 102, and/or utilization data indicative of an amount of utilization of the CPU(s) 130 and/or the GPU(s) 132. These are merely example types of data that may be indicative of the noise 140 that is being produced by the fan(s) 118, and other types of data indicative of the fan noise 140 can be received at block 202.

At 204, the processor(s) 116 may determine, based at least in part on the data received at block 202, and using a model(s) 138, one or more audio parameter values. For example, the processor(s) 116 may determine audio parameter values such as, without limitation, a frequency parameter value, a phase parameter value, an amplitude parameter value, or the like. The model(s) 138 used by the processor(s) 116 to make this determination at block 204 may include, without limitation, a mathematical model, a statistical model, a model of weights, a trained machine learning model, or the like. These types of models 138 may be generated based on previously-collected data associated with operating a fan(s) 118 of a HMD 102 while a HMD system 100 is executing an application(s) 112, as described above. For example, a HMD 102 with a fan(s) 118 can be used as a testing unit during heuristic testing to determine the data (e.g., audio data, temperature data, drive data, utilization data, etc.) that is indicative of the noise 140 that is being produced by the fan(s) 118 over its operating range (or a portion thereof), and the resultant mapping between the input data to the audio characteristic(s) of the fan noise 140 can be reflected in the model(s) 138 so that the processor(s) 116 can determine, from the new data received at block 202, and using the model(s) 138, the audio parameter value(s) for a noise reduction signal. As another example, a machine learning model(s) 138 can be trained using previously-collected data associated with operating a fan(s) 118 of a HMD 102 while a HMD system 100 is executing an application(s) 112, and the trained machine learning model(s) 138 can be used at block 204 to output the audio parameter value(s) as a classification of a noise reduction signal (e.g., a classification in terms of the noise reduction signal's audio parameter values, such as frequency, amplitude, phase, etc.).

At 206, a sound(s) 142 having one or more audio characteristics based at least in part on the audio parameter value(s) determined at block 204 may be output via the off-ear speaker(s) 114 of the HMD 102 to reduce the noise 140 produced by the fan(s) 118 at a location(s) of an ear(s) of the user 106 of the HMD 102. In an implementation of a HMD 102 having multiple off-ear speakers 114, such as a first (e.g., left) off-ear speaker 114(1) and a second (e.g., right) off-ear speaker 114(2), the outputting at block 206 may involve, at block 208, outputting, via the first (e.g., left) off-ear speaker 114(1), a first sound 142 having one or more first audio characteristics to reduce the noise 140 produced by the fan(s) 118 at a location of a first (e.g., left) ear of the user 106, and, at block 210, outputting, via the second (e.g., right) off-ear speaker 114(2), a second sound 142 having one or more second audio characteristics to reduce the noise 140 produced by the fan(s) 118 at a location of a second (e.g., right) ear of the user 106. In some examples, the audio characteristic(s) of the sound(s) 142 output at block 206 may include, without limitation a frequency of the sound(s) 142 (or sound wave), an amplitude of the sound(s) 142 (or sound wave), a phase of the sound(s) 142 (or sound wave), among other possible audio characteristics. In some examples, the first audio characteristic(s) of the first sound 142 output by the first (e.g., left) off-ear speaker 114(1) may be different than the second audio characteristic(s) of the second sound 142 output by the second (e.g., right) off-ear speaker 114(2). In some examples, the noise reducing sound(s) 142 output at block 206 may be represented by a sound wave having any suitable audio characteristic that destructively interferes with the sound wave of the fan noise 140 at a location(s) of the ear(s) of the user 106 to reduce or attenuate the noise 140 produced by the fan(s) 118 in the vicinity of the user's ear(s), as described herein.

Figure 3:
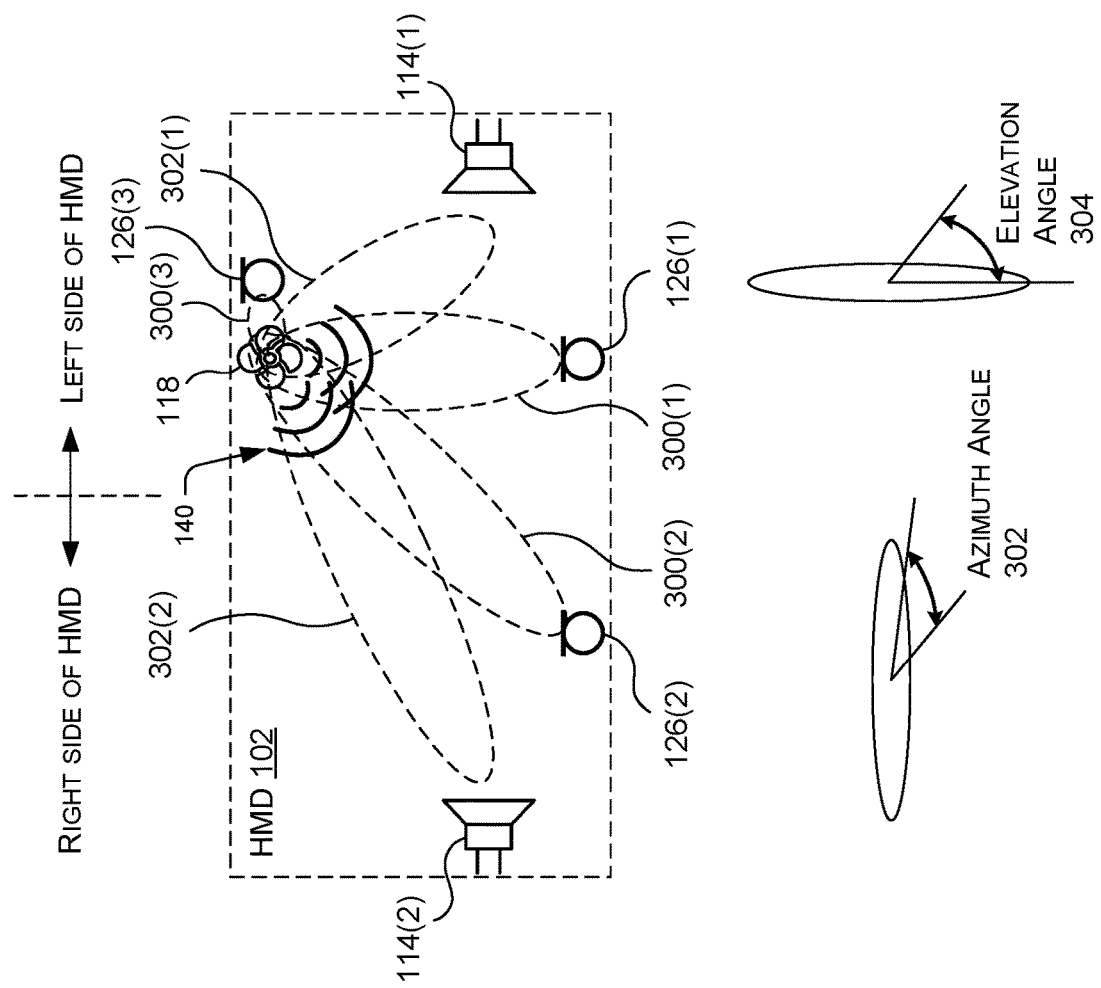
FIG. 3 is a diagram illustrating an example technique for using microphones of the HMD for actively reducing noise-producing fan(s) of the HMD relative to at least one of the microphones.

FIG. 3 is a diagram illustrating an example technique for using microphones 126 of the HMD 102 for actively reducing noise produced by a fan(s) 118 (i.e., a source of unwanted noise 140) of the HMD 102. FIG. 3 depicts a diagrammatic representation of the HMD 102 as if looking at the user 106 wearing the HMD 102 face on (i.e., looking at the front of the HMD 102). Accordingly, the HMD 102 is shown as having a pair of off-ear speakers 114 including a first (e.g., left) off-ear speaker 114(1) and a second (e.g., right) off-ear speaker 114(2). The HMD 102 is also shown as having a pair of microphones 126 including a first (e.g., left) microphone 126(1) and a second (e.g., right) microphone 126(2). The first off-ear speaker 114(1) and the first microphone 126(1) may be located on the left side of the HMD 102, and the second off-ear speaker 114(2) and the second microphone 126(2) may be located on the right side of the HMD 102. For example, the first microphone 126(1) may be positioned at or near the user's 106 left cheekbone when the user 106 is wearing the HMD 102, and the second microphone 126(2) may be positioned at or near the user's 106 right cheekbone when the user 106 is wearing the HMD 102. These are merely example positions of the microphones 126(1) and 126(2), and it is to be appreciated that the microphones 126 may be positioned elsewhere on the HMD 102. It is also to be appreciated that additional microphones 126 may be included in the HMD 102 for a microphone array with a number of microphones 126 that is greater than two microphones 126(1) and 126(2). The pair of microphones 126(1) and 126(2) shown in FIG. 3 may be used as a dual microphone array, or a linear array of microphones 126, configured to capture audio data of their surroundings. In some examples, the individual microphones 126 are omnidirectional microphones, meaning that the microphones 126 respond equally to sounds coming from any direction.

Although one use of the microphones 126 of the HMD 102 may be to capture the sound of the user's 106 voice (e.g., to allow the user 106 to issue voice commands, and/or talk to other users wearing other HMDs, etc.), the microphones 126 of the HMD 102 may also be configured to generate audio data representing the noise 140 that is being produced by the fan(s) 118 of the HMD 102 for use of the audio data in ANR, as described herein. In the example of FIG. 3, when the fan(s) 118 produces noise 140, first audio data representing the noise 140 captured by the first microphone 126(1) may be generated. In addition, second audio data representing the noise 140 captured by the second microphone 126(2) may be generated when the fan(s) 118 produces the noise 140. The first audio data (associated with the first microphone 126(1)) and the second audio data (associated with the second microphone 126(2)) can exhibit a phase difference during the time interval in which the microphones 126(1) and 126(2) receive or capture the fan noise 140. This phase difference can be used to find the direction of the noise source, which, in this case, is the fan 118. Accordingly, the microphones 126(1) and 126(2) of the HMD 102 can be used as a phased array to localize the source of the unwanted fan noise 140.

FIG. 3 illustrates a first instance 300(1) of the noise 140 produced by the fan 118 that is detected by the first microphone 126(1) and a second instance 300(2) of the noise 140 produced by the fan 118 that is detected by the second microphone 126(2). The fan noise 140 may result in different audio data generated by each microphone 126 due to the direction and/or the location of the fan 118 relative to each microphone 126. In some examples, the direction and/or location of the fan 118 relative to each microphone 126 can be described in terms of a relative azimuth angle 302 and a relative elevation angle 304 from either microphone 126(1) or 126(2), or from another location (e.g., from a midpoint between the microphones 126(1) and 126(2)). The relative direction and/or location of the fan 118 from each of the microphones 126 of the HMD 102 may dictate the audio parameter(s) values of the noise reduction signal(s), as described herein. That is, the model(s) 138 may include or otherwise reflect the directionality and/or the relatively location of the fan(s) 118 of the HMD 102 with respect to the microphone(s) 126, and the audio parameter value(s) (e.g., a frequency parameter value, a phase parameter value, and/or an amplitude parameter value, etc.) determined at block 204 of the process 200—which can be used to output the noise reducing sound 142 via the off-ear speakers 114(1) and 114(2)—may vary depending on the direction and/or location of the fan(s) 118 relative to the first microphone 126(1) and/or the second microphone 126(2). Accordingly, the directionality of the fan(s) 118 may be factored into the determination of the audio parameter value(s) at block 204 of the process 200, in some examples.

It is also to be appreciated that the HMD 102 may include multiple fans 118, and that, in such examples, the respective directions to individual ones of the multiple fans 118 can be factored into the ANR techniques described herein. In such examples, each fan 118 may be treated as an independent source of unwanted noise and the ANR techniques described herein may be performed independently with respect to individual ones of the fans 118. Alternatively, the model(s) 138 can be used to output a noise reducing sound(s) 142 as a coordinated effort to reduce multiple different noises 140 being produced by multiple different fans 118 of the HMD 102. In some examples, multiple fans 118 can be located on the head strap 107 of the HMD 102, such as at the back of the head strap 107.

FIG. 3 illustrates a third instance 302(1) of the noise 140 produced by the fan 118 as it sounds at a location of a first (e.g., left) ear of the user 106 near the first (e.g., left) off-ear speaker 114(1), and a fourth instance 302(2) of the noise 140 produced by the fan 118 as it sounds at a location of a second (e.g., right) ear of the user 106 near the second (e.g., right) off-ear speaker 114(2). Notably, third instance 302(1) of the fan noise 140 is different than the first instance 300(1) of the fan noise 140. This can be due to the first microphone 126(1) being at a different location than the first (e.g., left) ear of the user 106. Likewise, the fourth instance 302(1) of the fan noise 140 is different than the second instance 300(2) of the fan noise 140, which can be due to the second microphone 126(2) being at a different location than the second (e.g., right) ear of the user 106. As described above, unit-by-unit testing can be performed to characterize what the fan noise 140 will sound like at a location of the ears based on audio data captured by the microphones 126, which may not be located at the same location as the ears, and the results of such testing can be used to generate the model(s) 138. At runtime, the model(s) 138 is usable to infer, based on audio data captured by the microphones 126, the audio parameter value(s) for the noise reduction signal to reduce the unwanted fan noise 140 at the locations of the user's ears.

In some examples, the HMD 102 may include a microphone(s) 126(3), such as a microphone(s) 126(3) that is disposed inside of the HMD 102 (e.g., within a main housing of the HMD 102. Accordingly, FIG. 3 illustrates another instance 300(3) of the noise 140 produced by the fan 118 that is detected by the microphone(s) 126(3). In some examples, the HMD 102 includes the microphone(s) 126(3) instead of including the microphones 126(1) and 126(2). In other examples, the HMD 102 includes the third microphone(s) 126(3) in addition to the microphones 126(1) and 126(2). The microphone(s) 126(3) may be strategically positioned within the HMD 102 for capturing the fan noise 140. In some examples, the microphone(s) 126(3) is dedicated for capturing the fan noise 140, as opposed to having dual functionality as a microphone that can be used for capturing user speech and fan noise 140, as described above with respect to the microphones 126(1) and 126(2). In some examples, the microphone(s) 126(3) is positioned in close proximity to (e.g., within a threshold distance from) the fan(s) 118 (e.g., a few millimeters, centimeters, etc. from the fan(s) 118) to optimize the capture of fan noise 140 by the microphone(s) 126(3). In any case, at runtime, the model(s) 138 may be used to infer, based on audio data captured by the microphone(s) 126(3), the audio parameter value(s) for the noise reduction signal to reduce the unwanted fan noise 140 at the locations of the user's ears.

In some examples, the ANR techniques described herein may utilize any suitable feedback and/or feedforward noise reduction techniques. Feedback noise reduction techniques may refer, for example, to techniques for using one or more feedback sensors (e.g., the microphone(s) 126 of the HMD 102, one or more additional microphones of the HMD 102 that are positioned at or near the location(s) of the off-ear speakers 114, etc.) to provide feedback for determining the effectiveness of the ANR algorithm. Feedforward noise reduction techniques may refer, for example, to adaptive or dynamic equalization techniques. In some examples, the audio data representing the fan noise 140 captured by the microphones 126 of the HMD 102 may be decomposed into frequency space, such as by computing a Fourier transform, and the resulting power spectrum may be analyzed to determine a dominant frequency band. A Taylor series expansion may be used to simplify the dominant frequency band into sine terms and cosine terms, each having a phase, frequency, and amplitude. A least squares equation, or any other suitable optimization equation, can then be used to determine the variables that optimize the phase, frequency, and/or amplitude (i.e., audio characteristics) of the noise reducing sound 142. This is one example of a feedforward ANR technique, and it is to be appreciated that any other suitable ANR techniques and/or mechanisms can be utilized for ANR, such as feedforward filters (e.g., an equalizer, such as an adaptive, dynamic, or feedback equalizer, including a finite impulse response (FIR) filter, an infinite impulse response (IIR) filter, etc.), feedback filters, fixed filters, programmable filters, programmable filter controllers, amplifiers, speed-noise translators, and/or any other suitable techniques and/or mechanisms. Feedforward ANR techniques may allow for dynamically adjusting the audio parameter value(s) of the noise reduction signal in real-time based on the input data (e.g., the data received at block 202 of the process 200) so that the noise reducing sound(s) 142 that is/are output via the off-ear speaker(s) 114 converges on the audio characteristic(s) that optimize(s) the noise reduction performance of the HMD system 100.

Figure 4:
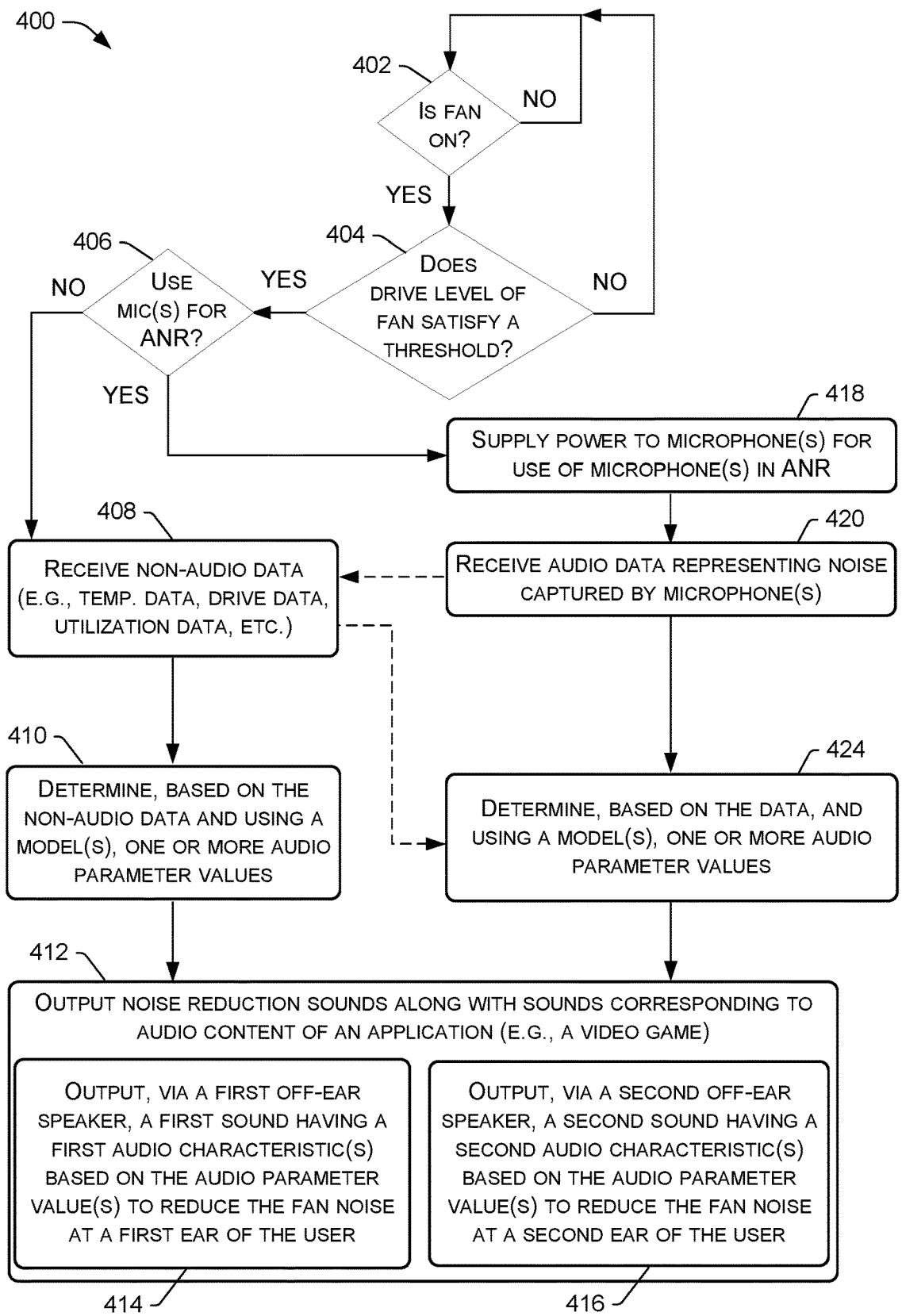
FIG. 4 is a flow diagram of an example process for actively reducing noise produced by a fan(s) of a HMD in an energy-efficient manner, in accordance with embodiments disclosed herein.

FIG. 4 is a flow diagram of an example process 400 for actively reducing noise 140 produced by a fan(s) 118 of a HMD 102 in an energy-efficient manner, in accordance with embodiments disclosed herein. For discussion purposes, the process 400 is described with reference to the previous figures. Furthermore, the process 400 may be implemented by the HMD system 100 described herein.

At 402, a processor(s) 116 of the HMD system 100 may determine whether a fan(s) 118 of a HMD 102 of the HMD system 100 is on or off. The fan(s) 118 being "on," as used herein, means that the fan(s) 118 is operating, and, hence, making noise 140. In some examples, the determination at block 402 can be made by determining whether the fan(s) 118 is/are drawing power from a power source(s) 128 (e.g., a battery) of the HMD 102. If the fan(s) 118 is not on (e.g., if the fan(s) 118 is not drawing power from the power source(s) 128 of the HMD 102) at block 402, the process 400 may follow the NO route from block 402 to iterate the determination at block 402 (e.g., by continually monitoring the on/off state of the fan(s) 118). In other words, if the fan(s) 118 is not operating, the processor(s) 116 may determine to refrain from executing an ANR algorithm in order to conserve energy of the HMD system 100 (e.g., to save battery power), because it takes resources, including power resources, to execute the ANR techniques described herein. Accordingly, if the fan(s) 118 is not operating, energy can be conserved by refraining from performing ANR and by continuing to monitor the on/off state of the fan(s) 118. In response to determining that the fan(s) 118 is on (e.g., in response to determining that the fan(s) 118 is drawing power from the power source(s) 128 of the HMD 102), the process 400 may follow the YES route from block 402 to block 404.

At 404, the processor(s) 116 may determine whether the fan(s) 118 is being driven at a level that satisfies a threshold level. "Satisfying" a threshold, as used herein, can mean that a value is equal to or greater than the threshold, or it can mean that the value is strictly greater than the threshold. Furthermore, the drive level and the threshold evaluated at block 404 may be in terms of any suitable metric, such as an index level, a percentage of a maximum drive level, a number of mA of input electrical current, and/or any other suitable metric. For example, a threshold evaluated at block 404 may be set to 10% of a maximum drive level of the fan(s) 118. In this example, if the threshold is not satisfied, meaning that the fan(s) 118 is being driven at a level that is less than (or equal to) 10% of a maximum drive level for the fan(s) 118, the process 400 may follow the NO route from block 404 to iterate blocks 402 and 404, such as by continually monitoring the on/off state and the drive level of the fan(s) 118. For instance, when the fan(s) 118 is being driven at a relatively low drive level, the noise 140 produced by the fan(s) 118 may be tolerable to the average HMD user, and it may not be worth the extra power to execute an ANR algorithm to reduce the fan noise 140 in this scenario. As such, as long as the fan(s) 118 is off or is being driven at a level that does not satisfy the threshold at block 404, the processor(s) 116 may refrain from executing an ANR algorithm. As a result, the noise 140 that is being produced by the fan(s) 118 may not be actively reduced in order to conserve energy of the HMD system 100. If, on the other hand, the processor(s) 116 determines that the fan(s) 118 is being driven at a level that satisfies the threshold at block 404, the process 400 may follow the YES route from block 404 to block 406 to initiate the execution of an ANR algorithm. In other words, in following the YES route from block 404, the processor(s) 116 may determine to execute an ANR algorithm to reduce the fan noise 400 at the cost of utilizing some resources, such as power resources, to do so. It is to be appreciated that this (i.e., following the YES route from block 404) could also trigger the process 200 of FIG. 2, which is an example of an ANR algorithm. The process 400 after block 404, as illustrated in FIG. 4, is an example of a more detailed ANR algorithm than the ANR algorithm of the process 200 of FIG. 2.

In some examples, a user 106 may be prompted for approval to execute an ANR algorithm before proceeding to block 406. That is, the processor(s) 116 may cause an output device(s) of the HMD 102 (e.g., a display(s), a speaker(s) 114, etc.) to output a prompt for the user 106 to approve of executing an ANR algorithm before the ANR algorithm is executed. The prompt may be output in any suitable format (e.g., a pop-up notification on the display(s) of the HMD 102, an audible prompt output via the speaker(s) 114, etc.) and may present any suitable type of message (e.g., a message that reads: "Do you want your headset to actively reduce the noise of the fan? Yes, or No?"). If the user 106 approves of executing the ANR algorithm (e.g., by providing user input indicative of a selection of a "Yes" option of the prompt), the process 400 may proceed to block 406 to initiate the execution of an ANR algorithm. Otherwise, if the user 106 does not provide his/her approval, the process 400 following the prompt, the process 400 may not execute the ANR algorithm from block 406 onward.

At 406, prior to receiving input data that is used in the ANR algorithm, the processor(s) 116 may determine whether to use, or to refrain from using, the microphone(s) 126 of the HMD 102 for ANR. Said another way, the processor(s) 116 may determine whether to use the power source(s) 128 of the HMD 102 to power the microphone(s) 126 for purposes of using the microphone(s) 126 in an ANR algorithm. Because it takes extra power to "open" the microphone(s) 126 and to capture audio data that can be used in the ANR techniques described herein, this decision at block 406 may be yet another power-conservation decision, which may be based on any suitable data or information. For example, if the remaining/stored/available power of the power source(s) 128 fails to satisfy (e.g., is less than (or equal to)) a threshold power level, the decision at block 406 may be a determination to refrain from using the microphone(s) 126 for ANR in order to conserve the remaining/stored/available power so that the power can be used for something other than powering the microphone(s) 126 for ANR. As another example, the user 106 may specify, in the settings of the HMD system 100, a user preference(s) as to whether the user 106 wants to use the microphone(s) 126 for ANR or not, and the decision at block 406 can be based at least in part on the user preference(s) in the settings of the HMD system 100. As yet another example, the level at which the fan(s) 118 is being driven may dictate whether to use the microphone(s) 126 for ANR or not. For example, when the fan(s) 118 is being driven at a relatively low level (e.g., if the drive level of the fan(s) fails to satisfy a second threshold greater than the threshold evaluated at block 404), the determination at block 406 may be to refrain from using the microphone(s) 126 for ANR, whereas, if the second threshold is satisfied, the determination at block 406 may be to utilize the microphone(s) 126 for ANR. As yet another example, a predicted ANR performance gain may be evaluated against a remaining level of power available from the power source(s) 128 of the HMD 102 to determine whether to use the microphone(s) 126 for ANR at block 406. For example, if one or more criteria are satisfied, such as the amount of remaining power satisfies a threshold and a predicted ANR performance gain of using the microphone(s) 126 for ANR also satisfies a threshold, the determination at block 406 may be to utilize the microphone(s) 126 for ANR, whereas, if one or more of the criteria is not satisfied, the determination at block 406 may be to refrain from using the microphone(s) 126 for ANR. In any event, if the processor (s) 116 determines to refrain from using the power source(s) 128 of the HMD 102 to power the microphone(s) 126 of the HMD 102 for purposes of using the microphone(s) 126 in an ANR algorithm, the process 400 may follow the NO route from block 406 to block 408.

At 408, the processor(s) 116 may receive non-audio data indicative of a noise 140 that is being produced by a fan(s) 118 of a HMD 102. This non-audio data can be any suitable type of data, as described herein, such as, without limitation, temperature data received from the temperature sensor(s) 124 of the HMD 102, drive data received from the drive circuitry 120 of the HMD 102, and/or utilization data regarding the utilization of the CPU(s) 130, the GPU(s) 132, and/or any other suitable non-audio data. In these examples, the temperature data may be indicative of a temperature sensed by the temperature sensor(s) 124 of the HMD 102, the drive data may be indicative of a level at which the fan(s) 118 is being driven via the drive circuitry 120 of the HMD 102, and/or the utilization data may be indicative of an amount of utilization of the CPU(s) 130, the GPU(s) 132 and/or another electronic component. These are merely example types of non-audio data that may be received at block 408 and that may be indicative of the noise 140 that is being produced by the fan(s) 118. It is also to be appreciated that multiple different types of non-audio data may be received at block 408.

At 410, the processor(s) 116 may determine, based at least in part on the non-audio data received at block 408, and using a model(s) 138, one or more audio parameter values for a noise reduction signal. Examples of audio parameter values determined at block 410 are described elsewhere herein and may include one or more of the audio parameter values described with reference to block 204 of the process 200.

At 412, a sound(s) 142 having one or more audio characteristics based at least in part on the audio parameter value(s) determined at block 410 may be output via the off-ear speaker(s) 114 of the HMD 102 to reduce the noise 140 produced by the fan(s) 118 at a location(s) of an ear(s) of the user 106 of the HMD 102. Additionally, the noise reducing sound(s) 142 output at block 412 may be one or more first sounds of multiple different sounds that are output contemporaneously via the off-ear speaker(s) 114. For example, the HMD system 100 may be executing an application(s) 112 (e.g., a video game that is being played by the user 106 using the HMD 102). Accordingly, the off-ear speaker(s) 114 may be outputting one or more second sounds corresponding to audio content of the executing application(s) 112 (e.g., audio content of the video game) while outputting the first, noise reducing sound(s) 142 at block 412. However, because the first, noise reducing sound(s) 142 destructively interferes with the fan noise 140 at a location(s) of the user's 106 ear(s), the user 106 does not hear the first, noise reducing sound(s) 142. Instead, the user 106 hears the sound corresponding to the audio content of the executing application(s) 112 (e.g., audio content of the video game), along with any other ambient noise of the user's 106 surroundings, excluding the fan noise 140.

In an implementation of a HMD 102 having multiple off-ear speakers 114, such as a first (e.g., left) off-ear speaker 114(1) and a second (e.g., right) off-ear speaker 114(2), the outputting at block 412 may involve, at block 414, outputting, via the first (e.g., left) off-ear speaker 114(1), a first sound 142 having one or more first audio characteristics to reduce the noise 140 produced by the fan(s) 118 at a location of a first (e.g., left) ear of the user 106, and, at block 416, outputting, via the second (e.g., right) off-ear speaker 114(2), a second sound 142 having one or more second audio characteristics to reduce the noise 140 produced by the fan(s) 118 at a location of a second (e.g., right) ear of the user 106. In some examples, the audio characteristic(s) of the sound(s) 142 output at block 412 may include, without limitation a frequency of the sound(s) 142 (or sound wave), an amplitude of the sound(s) 142 (or sound wave), a phase of the sound(s) 142 (or sound wave). In some examples, the first audio characteristic(s) of the first sound 142 output by the first (e.g., left) off-ear speaker 114(1) at block 414 may be different than the second audio characteristic(s) of the second sound 142 output by the second (e.g., right) off-ear speaker 114(2) at block 416. In some examples, the noise reducing sound(s) 142 output at block 412 may be represented by a sound wave having any suitable audio characteristic that destructively interferes with the sound wave of the fan noise 140 at a location(s) of the ear(s) of the user 106 to reduce or attenuate the noise 140 produced by the fan(s) 118 in the vicinity of the user's ear(s).

In some examples, the HMD 102 may include multiple off-ear speakers 114 that are located at different locations with respect to an ear(s) of the user's 106. For example, the multiple off-ear speaker 114 may surround the user's 106 right ear and/or the user's 106 left ear. As such, the HMD 102 may be configured to output sound from any individual off-ear speaker 114 at any suitable time, such as via an off-ear speaker 114 that is positioned behind the user's right ear and/or via an off-ear speaker 114 that is positioned in front of the user's left ear, or the like. For instance, a speaker array can be implemented in or on the headband of the HMD 102, some of the off-ear speakers 114 being positioned behind the ears, some of the off-ear speakers 114 being positioned in front of the ears, and some of the off-ear speakers 114 being laterally aligned with the ears. In some examples, the off-ear speakers 114 may be disposed within the HMD 102 (e.g., inside of a main housing of the HMD 102). In these or other similar implementations of the HMD 102, the processor(s) 116 may determine which off-ear speaker(s) 114 of multiple off-ear speaker(s) 114 from which to output the noise reducing sound(s) 142 at block 412. For example, the processor(s) 116 may select a first off-ear speaker(s) 114 positioned in front of the left ear of the user 106 and may select a second off-ear speaker(s) 114 positioned behind the right ear of the user 106, and the processor(s) 116 may cause the noise reducing sounds 142 to be output via the selected off-ear speakers 114 at block 412. Accordingly, the location relative to the ear(s) from which to emit the noise reducing sound 142 from a selected off-ear speaker(s) 114 can be dynamically determined in the ANR techniques described herein.

Returning to the decision block 406, if the processor(s) 116 determines to use the power source(s) 128 of the HMD 102 to power the microphone(s) 126 of the HMD 102 for purposes of using the microphone(s) 126 in an ANR algorithm, the process 400 may follow the YES route from block 406 to block 418.

At 418, power may be supplied to the microphone(s) 126 of the HMD 102 for use of the microphone(s) 126 in an ANR algorithm. This is sometimes referred to as "opening" the microphone(s) 126 to capture sound in their environment. In some examples, a subset of the microphones 126 may be selected for use in an ANR algorithm and power may be exclusively supplied to the selected subset of microphones 126 at block 418. For instance, the processor(s) 116 may select the first microphone 126(1) and may supply power to the first microphone 126(1) without supplying power to the second microphone 126(2) at block 418, or vice versa. This is merely one example of how a subset of microphones 126 may be selected and power supplied thereto. In other examples, power may be supplied to an entire set of microphones 126 of the HMD 102 at block 418.

At 420, the processor(s) 116 may receive audio data representing fan noise 140 captured by the powered microphone(s) 126 of the HMD 102. This is because the fan(s) 118 is operating at or above a threshold drive level (e.g., following the "YES" route from block 404), and, hence, making noise 140. The fan noise 140 is also audible in the vicinity of the powered microphone(s) 126, which allows the microphone(s) 126 to capture the fan noise 140 and to generate audio data based on the captured fan noise 140. As shown by the dashed arrow from block 420 to block 408, the process 400 may also include receiving non-audio data at block 408 in addition to receiving the audio data at block 420.

At 424, the processor(s) 116 may determine, based at least in part on the audio data received at block 420 (and potentially based on the non-audio data received at block 408, as indicated by the dashed line in FIG. 4 from block 408 to block 424), and using a model(s) 138, one or more audio parameter values, such as those described elsewhere herein, including those described with reference to block 204 of the process 200. In some examples, the processor(s) 116 may determine, using the first microphone 126(1) and the second microphone 126(2), an audio characteristic(s) (e.g., a phase, an amplitude, etc.) of a waveform corresponding to the noise 140 produced by the fan(s) 118, and the audio parameter value(s) may be determined at block 424 based at least in part on the audio characteristic(s) of the waveform. For instance, multiple data points of the audio characteristic(s) can be determined over time and can be used to reconstruct the complex amplitude of the waveform corresponding to the fan noise 140, which provides the processor 116 with spatial information (e.g., directionality) associated with the source of the noise 140, and which allows the processor 116 to infer how the fan noise would sound at the locations of the ears. Following block 424, a noise canceling sound(s) 142 may be output via the off-ear speaker(s) 114 of the HMD 102 at block 412, as described above.

Figure 5:
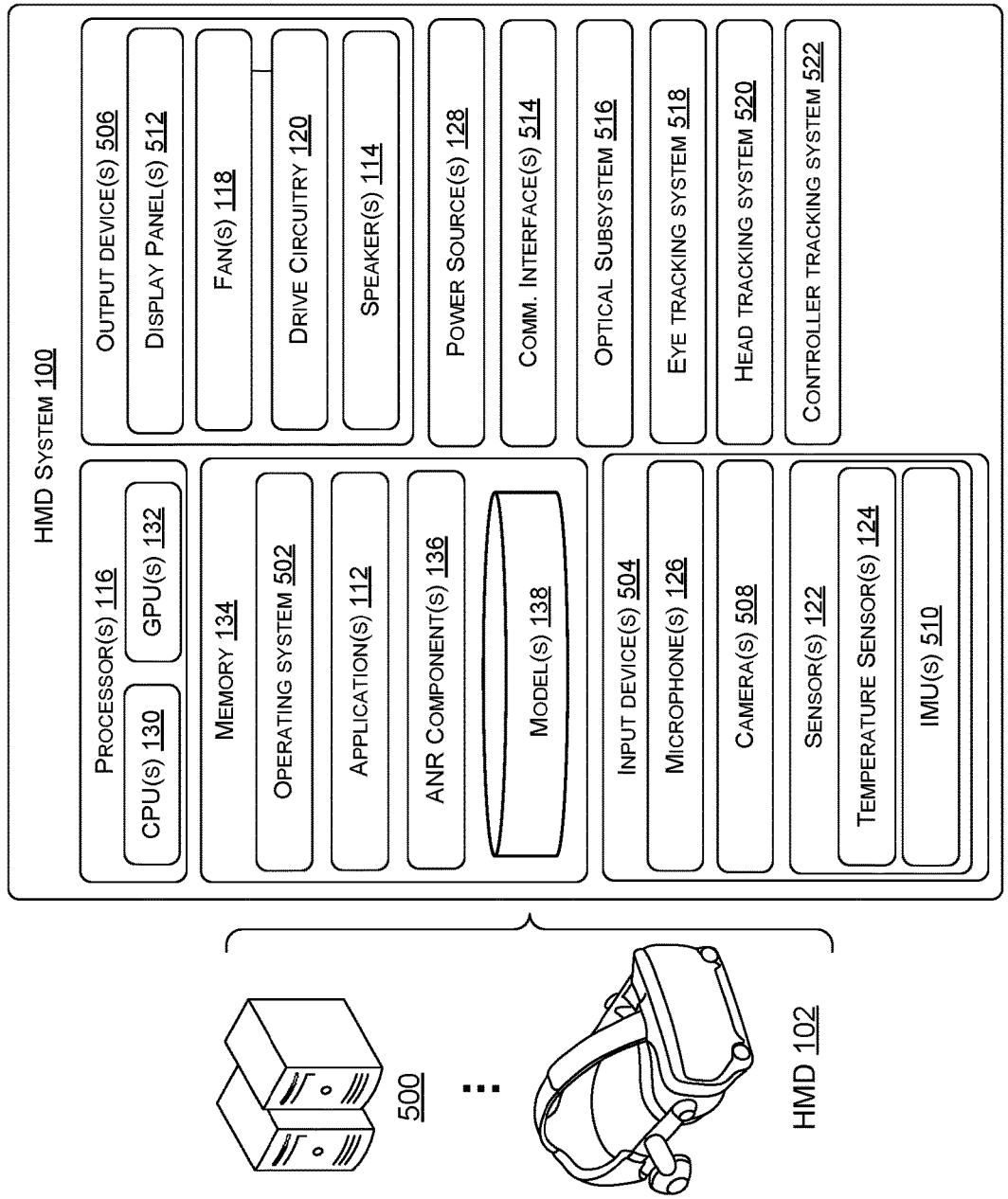
FIG. 5 illustrates example components of a HMD system in which the techniques disclosed herein can be implemented, in accordance with embodiments disclosed herein.

FIG. 5 illustrates example components of a HMD system 100 in which the techniques disclosed herein can be implemented, in accordance with embodiments disclosed herein. As mentioned above, the HMD system 100 can be a distributed system including the HMD 102 and one or more additional computers 500 that is/are communicatively coupled to the HMD 102. In FIG. 5, the additional computer(s) 500 may represent the host computer 104 and/or the remote system 108 of FIG. 1. Alternatively, the HMD system 100 can be a standalone HMD 102.

The HMD 102 may be implemented as a device that is to be worn by a user 106 (e.g., on a head of the user 106). In some embodiments, the HMD 102 may be head-mountable, such as by allowing a user 106 to secure the HMD 102 on his/her head using a securing mechanism (e.g., an adjustable band) that is sized to fit around a head of a user 106. In some embodiments, the HMD 102 comprises a VR or AR headset that includes a near-eye or near-to-eye display(s). As such, the terms "wearable device", "wearable electronic device", "VR headset", "AR headset", and "head-mounted display (HMD)" may be used interchangeably herein to refer to the device 102. However, it is to be appreciated that these types of devices are merely example of a HMD 102, and it is to be appreciated that the HMD 102 may be implemented in a variety of other form factors.

In the illustrated implementation, the HMD system 100 includes the one or more processors 116 and the memory 134 (e.g., computer-readable media 134) that were introduced in FIG. 1. In some implementations, the processors(s) 116 may include a CPU(s) 130, a GPU(s) 132, both a CPU(s) 130 and a GPU(s) 132, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 116 may possess its own local memory, which also may store program modules, program data, and/or one or more operating systems.

The memory 134 may include volatile and nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computing device. The memory 134 may be implemented as computer-readable storage media ("CRSM"), which may be any available physical media accessible by the processor(s) 116 to execute instructions stored on the memory 134. In one basic implementation, CRSM may include RAM and Flash memory. In other implementations, CRSM may include, but is not limited to, ROM, EEPROM, or any other non-transitory and/or tangible medium which can be used to store the desired information and which can be accessed by the processor(s) 116.

In general, the HMD system 100 may include logic (e.g., software, hardware, and/or firmware, etc.) that is configured to implement the techniques, functionality, and/or operations described herein. The computer-readable media 134 is shown as including various modules, such as instruction, datastores, and so forth, which may be configured to execute on the processor(s) 116 for carrying out the techniques, functionality, and/or operations described herein. A few example functional modules are shown as stored in the computer-readable media 134 and executable on the processor(s) 116, although the same functionality may alternatively be implemented in hardware, firmware, or as a system on a chip (SOC), and/or other logic.

An operating system module 502 may be configured to manage hardware within and coupled to the HMD 102 and/or the HMD system 100 for the benefit of other modules. In addition, in some instances the HMD system 100 may include one or more applications 112 stored in the memory 134 or otherwise accessible to the HMD system 100. In this implementation, the application(s) 112 includes a gaming application. However, the HMD system 100 may include any number or type of applications and is not limited to the specific example shown here. An ANR component(s) 136 may be configured to perform the ANR techniques described herein to reduce fan noise 140 at a location(s) of the user's 106 ear(s). The memory 134 may further store the model(s) 138 described herein as usable to implement the ANR techniques described herein.

Generally, the HMD system 100 has input devices 504 and output devices 506. The input devices 504 may include control buttons. In some implementations, one or more microphones 126 may function as input devices 504 to receive audio input, such as user voice input, as well as to capture audio data representing the fan noise 140 for use in the ANR techniques described herein. In some examples, the microphone(s) 126 have a frequency response within a range of about 20 Hertz (Hz) to 24 kilohertz (Hz), and a sensitivity of about −25 decibels relative to full scale (dBFS)/pascal (Pa) at 1 kHz. In some implementations, one or more cameras 508 or other types of sensors 122, such as the aforementioned temperature sensor(s) 124, an inertial measurement unit (IMU) 510, or the like, may function as input devices 504. For example, the IMU 510 may be configured to detect head motion of the user 106, including for gestural input purposes. The sensors 122 may further include sensors used to generate motion, position, and orientation data, such as gyroscopes, accelerometers, magnetometers, color sensors, or other motion, position, and orientation sensors. The sensors 122 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The sensors 122 may include light sensors that are sensitive to light (e.g., infrared or visible light) that is projected or broadcast by base stations in the environment of the HMD 102. IMU 510 may be an electronic device that generates calibration data based on measurement signals received from accelerometers, gyroscopes, magnetometers, and/or other sensors suitable for detecting motion, correcting error associated with IMU 510, or some combination thereof. Based on the measurement signals such motion-based sensors, such as the IMU 510, may generate calibration data indicating an estimated position of HMD 102 relative to an initial position of HMD 102. For example, multiple accelerometers may measure translational motion (forward/back, up/down, left/right) and multiple gyroscopes may measure rotational motion (e.g., pitch, yaw, and roll). IMU 510 can, for example, rapidly sample the measurement signals and calculate the estimated position of HMD 102 from the sampled data. For example, IMU 510 may integrate measurement signals received from the accelerometers over time to estimate a velocity vector and integrates the velocity vector over time to determine an estimated position of a reference point on HMD 102. The reference point is a point that may be used to describe the position of the HMD 102. While the reference point may generally be defined as a point in space, in various embodiments, reference point is defined as a point within HMD 102 (e.g., a center of the IMU 510). Alternatively, IMU 510 provides the sampled measurement signals to an external console (or other computing device), which determines the calibration data.

The sensors 122 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds. As mentioned, in some embodiments, the sensors 122 may include light sensors that are sensitive to light emitted by base stations in the environment of the HMD 102 for purposes of tracking position and/or orientation, pose, etc., of the HMD 102 in three-dimensional (3D) space. The calculation of position and/or orientation may be based on timing characteristics of light pulses and the presence or absence of light detected by the sensors 122.

In some embodiments, additional input devices 504 may be provided in the form of a keyboard, keypad, mouse, touch screen, joystick, and the like. In other embodiments, the HMD system 100 may omit a keyboard, keypad, or other similar forms of mechanical input. In some examples, the input device(s) 504 may include control mechanisms, such as basic volume control button(s) for increasing/decreasing volume, as well as power and reset buttons.

The output devices 504 may include a display(s) or display panels 512, (e.g., a stereo pair of display panels). The display panel(s) 512 of the HMD system 100 may utilize any suitable type of display technology, such as an emissive display that utilizes light emitting elements (e.g., light emitting diodes (LEDs)) to emit light during presentation of frames on the display panel(s) 512. As an example, display panel(s) 512 of the HMD system 100 may comprise liquid crystal displays (LCDs), organic light emitting diode (OLED) displays, inorganic light emitting diode (ILED) displays, or any other suitable type of display technology for HMD applications. The output devices 506 may further include, without limitation, a light element (e.g., LED), a vibrator to create haptic sensations, as well as the aforementioned fan(s) 118 and associated drive circuitry 120, as well as the off-ear speaker(s) 114. In some examples, the off-ear speaker(s) 114 are 37.5 millimeter (mm) off-ear Balanced Mode Radiators (BMR), with a frequency response within a range of about 40 Hz and 24 kHz, an impedance of 6 Ohm, a sound pressure level (SPL) of 98.96 dBSPL at 1 centimeter (cm). In some examples, the off-ear speaker(s) 114 is/are implemented in the form of a sound bar, a speaker(s) embedded in the main HMD body, and/or speakers embedded in the headband of the HMD 102.

The HMD system 100 may include a power source(s) 128, such as one or more batteries. Additionally, or alternatively, the HMD 102 may include a power cable port to connect to an external power source via wired means, such as a cable.

The HMD system 100 may further include a communications interface(s) 514, such as a wireless unit coupled to an antenna(s) to facilitate a wireless connection to a network. Such a wireless unit may implement one or more of various wireless technologies, such as Wi-Fi, Bluetooth, radio frequency (RF), and so on. It is to be appreciated that the HMD 102 may further include physical ports to facilitate a wired connection to a network, a connected peripheral device (including the compute(s) 500, such as the host computer 104, which may be a PC, a game console, etc.), or a plug-in network device that communicates with other wireless networks.

The HMD 102 may further include optical subsystem 516 that directs light from the electronic display panel(s) 512 to a user's eye(s) using one or more optical elements. The optical subsystem 516 may include various types and combinations of different optical elements, including, without limitations, such as apertures, lenses (e.g., Fresnel lenses, convex lenses, concave lenses, etc.), filters, and so forth. In some embodiments, one or more optical elements in optical subsystem 516 may have one or more coatings, such as anti-reflective coatings. Magnification of the image light by optical subsystem 516 allows electronic display panel(s) 512 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). Optical subsystem 516 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to electronic display panel(s) 512 for display is pre-distorted, and optical subsystem 516 corrects the distortion when it receives image light from electronic display panel(s) 512 generated based on the content.

The HMD system 100 may further include an eye tracking system 518. A camera 508 or other optical sensor inside HMD 102 may capture image information of a user's eyes, and eye tracking system 518 may use the captured information to determine interpupillary distance, interocular distance, a 3D position of each eye relative to HMD 102 (e.g., for distortion adjustment purposes), including a magnitude of torsion and rotation (i.e., roll, pitch, and yaw) and gaze directions for each eye. In one example, infrared light is emitted within HMD 102 and reflected from each eye. The reflected light is received or detected by a camera of the HMD 102 and analyzed to extract eye rotation from changes in the infrared light reflected by each eye. Many methods for tracking the eyes of a user 106 can be used by eye tracking system 518. Accordingly, eye tracking system 518 may track up to six degrees of freedom of each eye (i.e., 3D position, roll, pitch, and yaw) and at least a subset of the tracked quantities may be combined from two eyes of a user 106 to estimate a gaze point (i.e., a 3D location or position in the virtual scene where the user is looking). For example, eye tracking system 518 may integrate information from past measurements, measurements identifying a position of a user's 106 head, and 3D information describing a scene presented by electronic display panel(s) 512. Thus, information for the position and orientation of the user's 106 eyes is used to determine the gaze point in a virtual scene presented by HMD 102 where the user 106 is looking.

The HMD system 100 may further include a head tracking system 520. The head tracking system 520 may leverage one or more of the sensors 122 to track head motion, including head rotation, of the user 106, as described above. For example, the head tracking system 520 can track up to six degrees of freedom of the HMD 102 (i.e., 3D position, roll, pitch, and yaw). These calculations can be made at every frame of a series of frames so that an application 112 (e.g., a video game) can determine how to render a scene in the next frame in accordance with the head position and orientation. In some embodiments, the head tracking system 520 is configured to predict a future position and/or orientation of the HMD 102 based on current and/or past data. This is because an application 112 is asked to render a frame before the user 106 actually sees the light (and, hence, the image) on the display(s) 512. Accordingly, a next frame can be rendered based on this future prediction of head position and/or orientation that was made at an earlier point in time, such as roughly 25-30 milliseconds (ms) prior to rendering the frame. In a distributed system where a host computer 104 is communicatively (e.g., wirelessly) coupled to the HMD 102, the future prediction of the head pose may be made 30 ms or more in advance of the illumination time for the frame to account for network latency, compression operations, etc. Rotation data provided by the head tracking system 520 can be used to determine both direction of HMD 102 rotation, and amount of HMD 102 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 102.

The HMD system 100 may further include a controller tracking system 522. The controller tracking system 522 may leverage one or more of the sensors 122 to track controller motion. For example, the controller tracking system 522 can track up to six degrees of freedom of the controllers the user 106 holds in his/her hands (i.e., 3D position, roll, pitch, and yaw). These calculations can be made at every frame of a series of frames so that an application 112 (e.g., a video game) can determine how to render virtual controllers and/or virtual hands in a scene in the next frame in accordance with the controller position(s) and orientation(s). In some embodiments, the controller tracking system 522 is configured to predict a future position and/or orientation of the HMD 102 based on current and/or past data, as described above with respect to the head tracking system 522.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A head-mounted display (HMD) system comprising:
    a HMD comprising:
        a power source;
        a fan;
        one or more microphones;
        a left off-ear speaker; and
        a right off-ear speaker;
    a processor; and
    memory storing computer-executable instructions that, when executed by the processor, cause the processor to:
        determine to refrain from using the power source to power the one or more microphones for purposes of using the one or more microphones in an active noise reduction algorithm;
        receive non-audio data indicative of a noise that is being produced by the fan;
        determine, based at least in part on the non-audio data and using a model, one or more audio parameter values;
        output, via the left off-ear speaker, a first sound having one or more first audio characteristics based at least in part on the one or more audio parameter values to reduce the noise produced by the fan at a location of a left ear of a user of the HMD; and
        output, via the right off-ear speaker, a second sound having one or more second audio characteristics based at least in part on the one or more audio parameter values to reduce the noise produced by the fan at a location of a right ear of the user.

2. The HMD system of claim 1, wherein:
    the processor comprises a central processing unit (CPU);
    the HMD further comprises at least one of:
        a temperature sensor to sense a temperature of an electronic component of the HMD;
        drive circuitry to drive the fan; or
        a graphics processing unit (GPU); and
    the non-audio data comprises at least one of:
        temperature data indicative of the temperature sensed by the temperature sensor;
        drive data indicative of a level at which the fan is being driven via the drive circuitry; or
        utilization data indicative of an amount of utilization of the CPU or the GPU.

3. The HMD system of claim 1, wherein the computer-executable instructions, when executed by the processor, further cause the processor to:
    determine that the fan is being driven at a level that satisfies a threshold level; and
    determine to execute the active noise reduction algorithm in response to determining that the fan is being driven at the level.

4. The HMD system of claim 1, wherein:
a video game is being played using the HMD; and
the computer-executable instructions, when executed by the processor, further cause the processor to:
output, via the left off-ear speaker, a third sound while outputting the first sound, the third sound corresponding to audio content of the video game; and
output, via the right off-ear speaker, a fourth sound while outputting the second sound, the fourth sound corresponding to the audio content.

5. The HMD system of claim 1, wherein the computer-executable instructions, when executed by the processor, further cause the processor to, after outputting the first sound and the second sound:
determine to use the power source to power the one or more microphones for purposes of using the one or more microphones in the active noise reduction algorithm;
receive audio data representing fan noise captured by the one or more microphones;
determine, based at least in part on the audio data, and using the model or a different model, one or more second audio parameter values;
output, via the left off-ear speaker, a third sound having one or more third audio characteristics based at least in part on the one or more second audio parameter values to reduce the fan noise at the location of the left ear; and
output, via the right off-ear speaker, a fourth sound having one or more fourth audio characteristics based at least in part on the one or more second audio parameter values to reduce the fan noise at the location of the right ear.

6. A method comprising:
determining, by a processor, to refrain from using a power source of a head-mounted display (HMD) to power one or more microphones of the HMD for purposes of using the one or more microphones in an active noise reduction algorithm;
receiving, by the processor, non-audio data indicative of a noise that is being produced by a fan of the HMD;
determining, by the processor, based at least in part on the non-audio data, and using a model, one or more audio parameter values; and
outputting, via one or more off-ear speakers of the HMD, a sound having one or more audio characteristics based at least in part on the one or more audio parameter values to reduce the noise produced by the fan at a location of an ear of a user of the HMD.

7. The method of claim 6, further comprising, after the outputting:
determining, by the processor to use the power source to power the one or more microphones for purposes of using the one or more microphones in the active noise reduction algorithm;
receiving, by the processor, audio data representing fan noise captured by the one or more microphones;
determining, by the processor, based at least in part on the audio data, and using the model or a different model, one or more second audio parameter values; and
outputting, via the one or more off-ear speakers, a second sound having one or more second audio characteristics based at least in part on the one or more second audio parameter values to reduce the fan noise at the location of the ear.

8. The method of claim 7, wherein:
the one or more microphones comprise a first microphone and a second microphone;
the method further comprises determining, by the processor, and using the first microphone and the second microphone, an audio characteristic of a waveform corresponding to the fan noise; and
the determining of the one or more second audio parameter values is based at least in part on the audio characteristic.

9. The method of claim 6, wherein the non-audio data comprises at least one of:
temperature data indicative of a temperature of an electronic component of the HMD sensed by a temperature sensor of the HMD;
drive data indicative of a level at which the fan is being driven via drive circuitry of the HMD; or
utilization data indicative of an amount of utilization of a central processing unit (CPU) of the HMD or a graphics processing unit (GPU) of the HMD.

10. The method of claim 6, further comprising:
determining, by the processor, that the fan is drawing power from the power source; and
determining, by the processor, to execute the active noise reduction algorithm in response to the determining that the fan is drawing the power.

11. The method of claim 6, wherein:
the one or more off-ear speakers comprise a first off-ear speaker and a second off-ear speaker; and
the outputting of the sound having the one or more audio characteristics comprises:
outputting, via the first off-ear speaker, a first sound having one or more first audio characteristics to reduce the noise produced by the fan at a location of a first ear of the user; and
outputting, via the second off-ear speaker, a second sound having one or more second audio characteristics to reduce the noise produced by the fan at a location of a second ear of the user.

12. The method of claim 11, wherein the one or more first audio characteristics of the first sound are different than the one or more second audio characteristics of the second sound.

13. A head-mounted display (HMD) system comprising:
a HMD comprising:
a power source;
a fan;
one or more microphones; and
one or more off-ear speakers;
a processor; and
memory storing computer-executable instructions that, when executed by the processor, cause the processor to:
determine to refrain from using the power source to power the one or more microphones for purposes of using the one or more microphones in an active noise reduction algorithm;
receive non-audio data indicative of a noise that is being produced by the fan;
determine, based at least in part on the non-audio data and using a model, one or more audio parameter values; and
output, via the one or more off-ear speakers, a sound having one or more audio characteristics based at least in part on the one or more audio parameter values to reduce the noise produced by the fan at a location of an ear of a user of the HMD.

14. The HMD system of claim 13, wherein:
the one or more off-ear speakers comprise a first off-ear speaker and a second off-ear speaker; and outputting the sound having the one or more audio characteristics comprises:
  outputting, via the first off-ear speaker, a first sound having one or more first audio characteristics to reduce the noise produced by the fan at a location of a first ear of the user; and
  outputting, via the second off-ear speaker, a second sound having one or more second audio characteristics to reduce the noise produced by the fan at a location of a second ear of the user.

15. The HMD system of claim 14, wherein:
the first off-ear speaker is located on a left side of the HMD;
the first ear is a left ear of the user;
the second off-ear speaker is located on a right side of the HMD; and
the second ear is a right ear of the user.

16. The HMD system of claim 14, wherein:
the noise produced by the fan has a third audio characteristic at the location of the first ear, and a fourth audio characteristic at the location of the second ear, the fourth audio characteristic different than the third audio characteristic; and
the one or more first audio characteristics of the first sound are different than the one or more second audio characteristics of the second sound such that the first sound reduces the noise having the third audio characteristic at the location of the first ear and the second sound reduces the noise having the fourth audio characteristic at the location of the second ear.

17. The HMD system of claim 13, wherein:
the processor comprises a central processing unit (CPU);
the HMD further comprises at least one of:
  a temperature sensor to sense a temperature of an electronic component of the HMD;
  drive circuitry to drive the fan; or
  a graphics processing unit (GPU); and
the non-audio data comprises at least one of:
  temperature data indicative of the temperature sensed by the temperature sensor;
  drive data indicative of a level at which the fan is being driven via the drive circuitry; or
  utilization data indicative of an amount of utilization of the CPU or the GPU.

18. The HMD system of claim 13, wherein the computer-executable instructions, when executed by the processor, further cause the processor to:
  determine that the fan is being driven at a level that satisfies a threshold level; and
  determine to execute the active noise reduction algorithm in response to determining that the fan is being driven at the level.

19. The HMD system of claim 13, wherein:
the sound is a first sound; and
the computer-executable instructions, when executed by the processor, further cause the processor to output, via the one or more off-ear speakers, a second sound corresponding to audio content of an executing application while outputting the first sound.

20. The HMD system of claim 13, wherein the computer-executable instructions, when executed by the processor, further cause the processor to, after outputting the sound:
  determine to use the power source to power the one or more microphones for purposes of using the one or more microphones in the active noise reduction algorithm;
  receive audio data representing fan noise captured by the one or more microphones;
  determine, based at least in part on the audio data, and using the model or a different model, one or more second audio parameter values; and
  output, via the one or more off-ear speakers, a second sound having one or more second audio characteristics based at least in part on the one or more second audio parameter values to reduce the fan noise at the location of the ear.

* * * * *